US012194919B2

(12) United States Patent
Anderson et al.

(10) Patent No.: US 12,194,919 B2
(45) Date of Patent: Jan. 14, 2025

(54) METHOD AND SYSTEM FOR ENABLING VEHICLE CONNECTED SERVICES FOR HEARING-IMPAIRED VEHICLE OCCUPANTS

(71) Applicant: GM Global Technology Operations LLC, Detroit, MI (US)

(72) Inventors: Esther Anderson, Canton, MI (US); Fan Bai, Ann Arbor, MI (US); Donald K. Grimm, Utica, MI (US); Paul E. Krajewski, Troy, MI (US); Jace C. Stokes, Highland, MI (US); Peter Finnegan, Marietta, GA (US); Hannah Elizabeth Wagner, Berkley, MI (US); Himabindu G. Sundaram, Troy, MI (US); Mark T. Gaylord, Palm City, FL (US); Travis Scott Hester, Rochester Hills, MI (US); Mark L. Reuss, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 214 days.

(21) Appl. No.: 18/171,504

(22) Filed: Feb. 20, 2023

(65) Prior Publication Data

US 2024/0278717 A1 Aug. 22, 2024

(51) Int. Cl.
*B60Q 1/00* (2006.01)
*B60Q 9/00* (2006.01)
(Continued)

(52) U.S. Cl.
CPC .............. *B60Q 9/00* (2013.01); *G06V 10/26* (2022.01); *G06V 10/764* (2022.01); *G06V 20/59* (2022.01);
(Continued)

(58) Field of Classification Search
CPC ........ B60Q 9/00; G06V 10/26; G06V 10/764; G06V 20/59; G06V 40/28; G10L 13/04;
(Continued)

(56) References Cited

U.S. PATENT DOCUMENTS 10,109,219 B2 * 10/2018 Zhou ...................... G06F 3/017
11,492,005 B1 * 11/2022 Bond .................... B60W 40/02
(Continued)

*Primary Examiner* — Toan N Pham
(74) *Attorney, Agent, or Firm* — Vivacqua Crane, PLLC

(57) ABSTRACT

A method for enabling vehicle connected services for a hearing-impaired vehicle occupant includes receiving sensor data from a plurality of sensors of a vehicle. The sensor data includes scene data indicative of a scene inside the vehicle and outside the vehicle. The method further includes determining that the hearing-impaired vehicle occupant is articulating sign language using the sensor data. Also, the method includes determining a vehicle-occupant message corresponding to the sign language articulated by the hearing-impaired vehicle occupant to generate vehicle occupant-message data in response to determining that the hearing-impaired vehicle occupant is articulating sign language. The method further includes transmitting the vehicle occupant-message data and the scene data to a remote system in response to generating the vehicle occupant-message data. Further, the method includes receiving a vehicle connected service from the remote system.

20 Claims, 7 Drawing Sheets

(51) Int. Cl.
*G06V 10/26* (2022.01)
*G06V 10/764* (2022.01)
*G06V 20/59* (2022.01)
*G06V 40/20* (2022.01)
*G10L 13/04* (2013.01)
*H04N 7/18* (2006.01)
*H04W 4/40* (2018.01)

(52) U.S. Cl.
CPC ............... *G06V 40/28* (2022.01); *G10L 13/04* (2013.01); *H04N 7/183* (2013.01); *H04W 4/40* (2018.02)

(58) Field of Classification Search
CPC ......... G10L 13/00; H04N 7/183; H04W 4/40; G09B 21/009
See application file for complete search history.

(56) References Cited

U.S. PATENT DOCUMENTS

| | | | |
|---|---|---|---|
| 2007/0195997 A1* | 8/2007 | Paul | G06T 7/251 382/104 |
| 2013/0155237 A1* | 6/2013 | Paek | G06F 3/0487 348/148 |
| 2013/0204457 A1* | 8/2013 | King | B60R 16/0373 701/1 |
| 2019/0092169 A1* | 3/2019 | Thurimella | G06F 3/011 |

* cited by examiner

METHOD AND SYSTEM FOR ENABLING VEHICLE CONNECTED SERVICES FOR HEARING-IMPAIRED VEHICLE OCCUPANTS

INTRODUCTION

The present disclosure relates to systems and methods for enabling vehicle connected services for hearing-impaired vehicle occupants.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles offer connected services. Connected services allow the vehicle to connect to a remote system. In response, the remote system provides one or more services, such as emergency services and roadside assistance.

SUMMARY

The present disclosure describes a method for enabling vehicle connected services for a hearing-impaired vehicle occupant. In an aspect of the present disclosure, the method includes receiving sensor data from a plurality of sensors of a vehicle. The sensor data includes scene data indicative of a scene inside and outside the vehicle, and the scene data includes an image of the hearing-impaired vehicle occupant. The method further includes determining that the hearing-impaired vehicle occupant is articulating sign language using the sensor data. The method also includes determining a vehicle-occupant message corresponding to the sign language articulated by the hearing-impaired vehicle occupant to generate vehicle occupant-message data in response to determining that the hearing-impaired vehicle occupant is articulating sign language. The vehicle occupant-message data is indicative of the vehicle-occupant message corresponding to the sign language articulated by the hearing-impaired vehicle occupant. Determining the vehicle-occupant message includes automatically converting a video of the sign language articulated by the hearing-impaired vehicle occupant to a text message and converting a text message to an audio message. Further, the method includes transmitting the vehicle occupant-message data and the scene data to a remote system in response to generating the vehicle occupant-message data. Also, the method includes receiving a vehicle connected service from the remote system in response to transmitting the vehicle occupant-message data and the scene data to the remote system. The vehicle connected service is responsive to the vehicle-occupant message from the hearing-impaired vehicle occupant. The method includes automatically converting sign language to text and then text to audio by a vehicle controller and/or a remote server. The method described in this paragraph improves vehicle technology by facilitating communication between a hearing-impaired vehicle occupant and a remote system.

In an aspect of the present disclosure, the scene data includes audio data and video data and other supportive vehicle sensor data. The method further includes determining a bandwidth available in a wireless network connecting the vehicle and the remote system in a real-time fashion, determining whether the bandwidth available in the wireless network connecting the vehicle and the remote system is greater than a first predetermined bandwidth threshold, and transmitting the audio data and the video data from the vehicle to the remote system in response to determining that the bandwidth available in the wireless network connecting the vehicle and the remote system is greater than the first predetermined bandwidth threshold.

In an aspect of the present disclosure, the scene data further includes semantic data. The semantic data includes camera-based occupant sensing data (location, pose, gesture and facial expression), data originating from Diver Monitoring System/DMS (identity, attention, expressions), and/or biometric systems (health status, anxiety levels). The method further includes determining whether the bandwidth available in the wireless network connecting the vehicle and the remote system is greater than a second predetermined bandwidth threshold. The second predetermined bandwidth threshold is less than the first predetermined bandwidth threshold. The method further includes transmitting the audio data and the semantic data from the vehicle to the remote system and refraining from transmitting the video data from the vehicle to the remote system in response to determining that the bandwidth available in the wireless network connecting the vehicle and the remote system is less than or equal to the first predetermined bandwidth threshold and greater than the second predetermined bandwidth threshold.

In an aspect of the present disclosure, the scene data further includes vehicular context data and text data. The vehicular context data is highly abstracted information that reflects the status of vehicle and its occupants, such as "vehicle engine is not functioning" or "occupant has a medical emergency". The method may also include determining whether the bandwidth available in the wireless network connecting the vehicle and the remote system is less than or equal to a third predetermined bandwidth threshold. The third predetermined bandwidth threshold is less than the second predetermined bandwidth threshold. The method further includes transmitting the text data and the vehicular context data and refraining from transmitting the audio data, the video data, and the semantic data in response to determining that the bandwidth available in the wireless network connecting the vehicle and the remote system is less than or equal to the third predetermined bandwidth threshold.

In an aspect of the present disclosure, the method includes receiving a remote-system message. The remote-system message includes remote articulated sign language data from a user of the remote system. The remote articulated sign language data includes a video of the user of the remote system articulating sign language in response to the vehicle-occupant message.

In an aspect of the present disclosure, the remote articulated sign language data is converted from audio received from the user of the remote system.

In an aspect of the present disclosure, the method further includes employing sematic segmentation to classify a plurality of objects in the scene inside the vehicle, assigning a priority to each of the plurality of objects in the scene inside the vehicle, and adjusting a network update rate of each of the plurality of objects based on the priority of each of the plurality of objects in the scene inside the vehicle when only limited wireless bandwidth is available.

In an aspect of the present disclosure, a path is defined in the wireless network from the vehicle to the remote system. The path includes a plurality of links. The method further includes monitoring quality-of-service (QOS) metrics along each of the plurality of links of the path and monitoring the QoS metrics along an entirety of the path defined from the vehicle to the remote system. The QoS metrics includes delay, jitter, packet drop rate, and bandwidth.

In an aspect of the present disclosure, the method includes synchronizing, in real time, the vehicle occupant-message data and the scene data between the vehicle and the remote system.

In an aspect of the present disclosure, the method further includes locally synchronizing the scene data among all of the plurality of sensors of the vehicle through the same system timestamp across the plurality of sensors.

In an aspect of the present disclosure, the remote system includes a plurality of virtual sensors that correspond to the plurality of sensors of the vehicle. The method further includes locally synchronizing the scene data among all of the plurality of virtual sensors at the side of remote system's cloud servers.

The present disclosure further describes a system for enabling vehicle connected services for a hearing-impaired vehicle occupant. In an aspect of the present disclosure, the system includes a plurality of sensors and a controller in communication with the plurality of sensors. The controller is programmed to receive sensor data from a plurality of sensors of a vehicle. The sensor data includes scene data indicative of a scene inside the vehicle, kinematic sensor data, and/or vehicle occupancy data. The scene data includes an image of a hearing-impaired vehicle occupant. The controller is further programmed to determine that the hearing-impaired vehicle occupant is articulating sign language using the sensor data. The controller is further programmed to determine a vehicle-occupant message corresponding to the sign language articulated by the vehicle occupant to generate vehicle occupant-message data in response to determining that the hearing-impaired vehicle occupant is articulating sign language. The vehicle occupant-message data is indicative of the vehicle-occupant message corresponding to the sign language articulated by the vehicle occupant. The controller is further programmed to transmit the vehicle occupant-message data and the scene data to a remote system in response to generating the vehicle occupant-message data. The controller is further programmed to receive a vehicle connected service from the remote system in response to transmitting the vehicle occupant-message data and the scene data to the remote system. The vehicle connected service is responsive to the vehicle-occupant message from the hearing-impaired vehicle occupant.

In an aspect of the present disclosure, the scene data includes audio data and video data. The controller is programmed to determine a bandwidth available in a wireless network connecting the vehicle and the remote system and determine whether the bandwidth available in the wireless network connecting the vehicle and the remote system is greater than a first predetermined bandwidth threshold. The controller is further programmed to transmit the audio data and the video data to the remote system in response to determining that the bandwidth available in the wireless network connecting the vehicle and the remote system is greater than the first predetermined bandwidth threshold.

In an aspect of the present disclosure, the scene data further includes semantic data. The controller is programmed to determine whether the bandwidth available in the wireless network connecting the vehicle and the remote system is less than or equal to the first predetermined bandwidth threshold and determine whether the bandwidth available in the wireless network connecting the vehicle and the remote system is greater than a second predetermined bandwidth threshold. The second predetermined bandwidth threshold is less than the first predetermined bandwidth threshold. The controller is further programmed to transmit the audio data and the semantic data to the remote system and refraining from transmitting the video data in response to determining that the bandwidth available in the wireless network connecting the vehicle and the remote system is less than or equal to the first predetermined bandwidth threshold and greater than the second predetermined bandwidth threshold.

In an aspect of the present disclosure, the scene data further includes context data and text data. The controller is programmed to determine whether the bandwidth available in the wireless network connecting the vehicle and the remote system is less than or equal to a third predetermined bandwidth threshold. The third predetermined bandwidth threshold is less than the second predetermined bandwidth threshold. The controller is further programmed to transmit the text data and the vehicular context data and refraining from transmitting the audio data, the video data, and the semantic data in response to determining that the bandwidth available in the wireless network connecting the vehicle and the remote system is less than or equal to the third predetermined bandwidth threshold.

In an aspect of the present disclosure, the vehicle connected service includes a remote-system message from the remote system. The remote-system message includes remote articulated sign language data from a user of the remote system. The remote articulated sign language data includes video of the user of the remote system articulating sign language.

In an aspect of the present disclosure, the remote articulated sign language data is converted from audio received from the user of the remote system.

The present disclosure also describes a tangible, non-transitory, machine-readable medium including machine-readable instructions, that when executed by a processor, cause the processor to receive sensor data from a plurality of sensors of a vehicle. The sensor data includes scene data indicative of a scene inside the vehicle, and the scene data includes an image of a hearing-impaired vehicle occupant. The machine-readable instructions also cause the processor to determine that the hearing-impaired vehicle occupant is articulating sign language using the sensor data and determine a vehicle-occupant message corresponding to the sign language articulated by the vehicle occupant to generate vehicle occupant-message data in response to determining that the hearing-impaired vehicle occupant is articulating sign language. The vehicle occupant-message data is indicative of the vehicle-occupant message corresponding to the sign language articulated by the vehicle occupant. The machine-readable instructions also cause the processor to transmit the vehicle occupant-message data and the scene data to a remote system in response to generating the vehicle occupant-message data and receive a vehicle connected service from the remote system in response to transmitting the vehicle occupant-message data and the scene data to the remote system. The vehicle connected service is responsive to the vehicle-occupant message from the hearing-impaired vehicle occupant.

In an aspect of the present disclosure, the machine-readable medium further includes machine-readable instructions, that when executed by the processor, causes the processor to determine a bandwidth available in a wireless network connecting the vehicle and the remote system, determine whether the bandwidth available in the wireless network connecting the vehicle and the remote system is greater than a first predetermined bandwidth threshold, and transmit the audio data and the video data to the remote system in response to determining that the bandwidth available in the wireless network connecting the vehicle and the remote system is greater than the first predetermined bandwidth threshold.

In an aspect of the present disclosure, the machine-readable medium further includes machine-readable instructions, that when executed by the processor, causes the processor to determine whether the bandwidth available in the wireless network connecting the vehicle and the remote system is less than or equal to the first predetermined bandwidth threshold, determine whether the bandwidth available in the wireless network connecting the vehicle and the remote system is greater than a second predetermined bandwidth threshold, and transmit the audio data and semantic data to the remote system and refraining from transmitting the video data in response to determining that the bandwidth available in the wireless network connecting the vehicle and the remote system is less than or equal to the first predetermined bandwidth threshold and greater than the second predetermined bandwidth threshold. The second predetermined bandwidth threshold is less than the first predetermined bandwidth threshold.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 2:
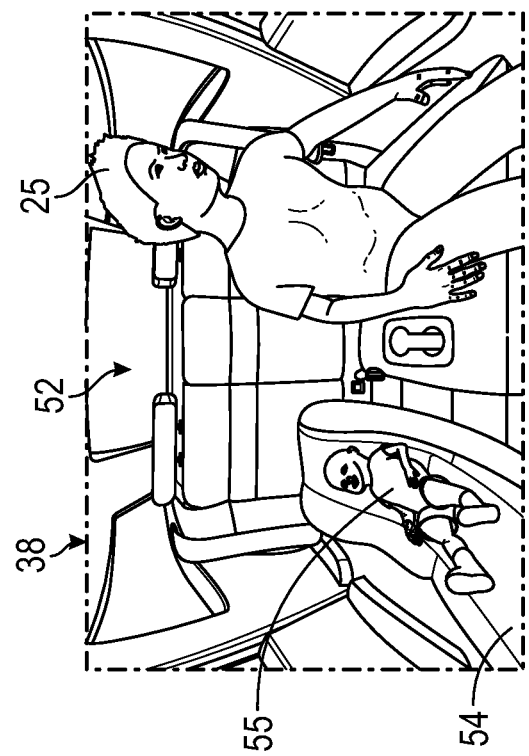
FIG. 2 is a schematic diagram of the scene inside the vehicle.

Reference will now be made in detail to several examples of the disclosure that are illustrated in accompanying drawings. Whenever possible, the same or similar reference numerals are used in the drawings and the description to refer to the same or like parts or steps.

Figure 1:
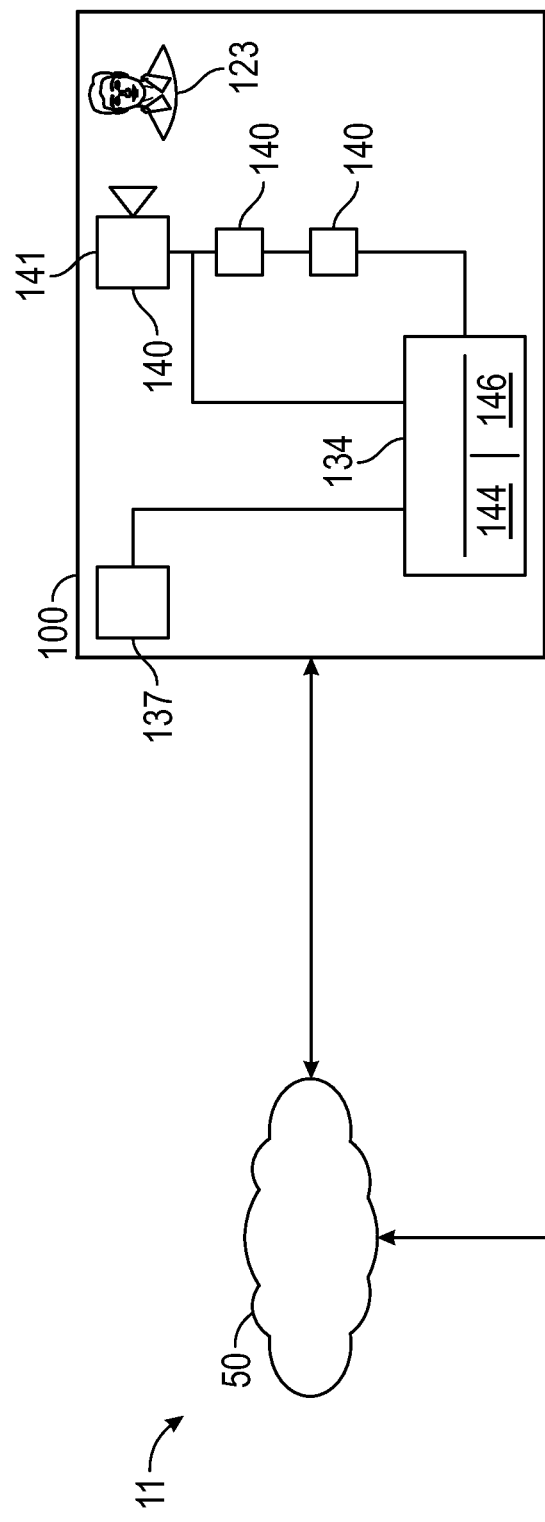
FIG. 1 is a schematic diagram of a system for enabling vehicle connected services for hearing-impaired vehicle occupants.

With reference to FIG. 1, a system 11 for enabling vehicle connected services for hearing-impaired vehicle occupants 25. The system 11 includes a vehicle 10, a remote system 100, such as a cloud-based system, and a wireless network 50 (e.g., a cellular network) to establish communication between the vehicle 10 and the remote system 100. Although the vehicle 10 is shown as a sedan, it is envisioned that that vehicle 10 may be another type of vehicle, such as a pickup truck, a coupe, a sport utility vehicle (SUVs), a recreational vehicle (RVs), etc. The remote system 100 facilitates communication with different entities to provide vehicle connected services, such as emergency services, remote vehicle access, remote vehicle start, roadside assistance, video chat, fleet/teen driver monitoring/interaction, among others. Some vehicle connected services rely on voice activated commands and/or audio notifications, such as audio messages or chimes, to operate. However, it may be challenging for hearing impaired individuals to hear audio notifications or activate vehicle connected services through voice commands. To address these challenges, the system 11 facilitates vehicle connected services for hearing-impaired vehicle occupants 25. Specifically, the system 11 leverages in-vehicle perception and cloud computing technologies to enable interactive communication between hearing-impaired vehicle occupants 25 and the remote system 100. For example, the system 11 may create a hearing impairment profile that may be used to support a variety of services (e.g., direction to use text, email or text telephone (TTY) for customer engagement, to closed-captions for any provided customer content using vehicle display or brand apps, to rank order or filter point of interest (POI) search results, to generate a haptic or visual alert based on an external horn activation detected). Preferences may be set using a smartphone app or vehicle settings, and the system 11 may also have the ability to specify impairment level (e.g., hard of hearing, total hearing loss). Vehicle access functions (e.g., chirp-on-lock and vehicle location) may be automatically set to lights only (or a variation specifically designed for hearing impaired individuals that uses addition visual alert modalities) or haptic fob feedback based on hearing impairment status profile information.

The vehicle 10 may include one or more vehicle communication transceivers 37 in communication with a vehicle controller 34. Each of the vehicle communication transceivers 37 is configured to wirelessly communicate information to and from other remote actors, such as remote vehicles, (through vehicle-to-vehicle (V2V) communication), infrastructure (through vehicle-to-infrastructure (V2I) communication), the remote system 100 at a remote call center (e.g., ON-STAR by GENERAL MOTORS, and/or personal electronic devices, such as a smart phone. The vehicle communication transceivers 37 may be configured to communicate via the wireless network 50, such as a cellular network. However, additional or alternate communication methods, such as a dedicated short-range communications (DSRC) or Cellular V2X (C-V2X) channel, are also considered within the scope of the present disclosure. DSRC or C-V2X channels refer to one-way or two-way short-range to medium-range wireless communication channels specifically designed for automotive use and a corresponding set of protocols and standards. Accordingly, the vehicle communication transceivers 37 may include one or more antennas for receiving and/or transmitting signals, such as cooperative sensing messages (CSMs). The vehicle communication transceivers 37 may be considered vehicle sensors 40 and/or sources of data.

Figure 3:
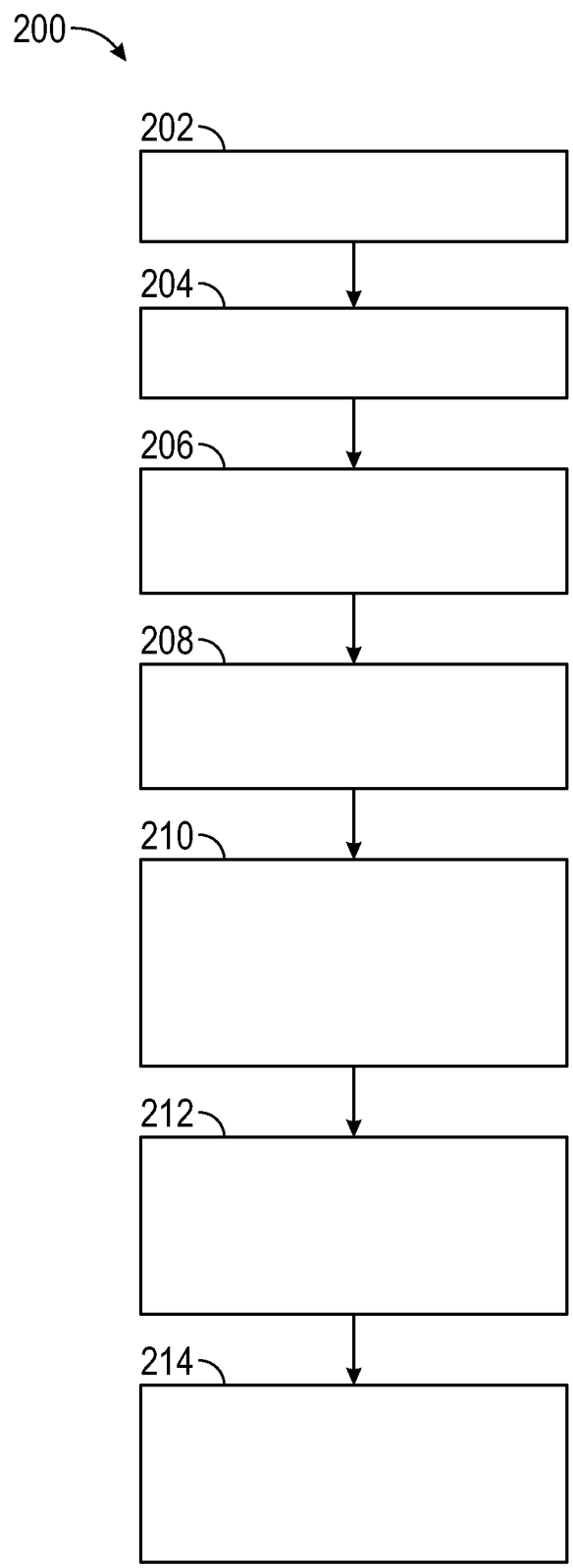
FIG. 3 is a flowchart of a method for enabling vehicle connected services for hearing-impaired vehicle occupants.

The vehicle 10 includes one or more vehicle controllers 34 in communication with the vehicle communication transceivers 37. The vehicle controller 34 includes at least one vehicle processor 44 and a vehicle non-transitory computer readable storage device or media 46. The vehicle processor 44 may be a custom-made processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The vehicle computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the vehicle processor 44 is powered down. The vehicle computer-readable storage device or media 46 of the vehicle controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 34 in controlling the vehicle 10. The vehicle non-transitory computer readable storage device or media 46 includes machine-readable instructions that when executed by the one or more vehicle processors 44, cause the vehicle processors 44 to execute at least part of the method 200 (FIG. 3).

The instructions may include one or more separate programs, each of which comprises an ordered listing of executable instructions for implementing logical functions. The instructions, when executed by the vehicle processor 44, receive and process signals from the cameras, perform logic, calculations, methods and/or algorithms for automatically controlling the components of the vehicle 10, and generate control signals to the actuators to automatically control the components of the vehicle 10 based on the logic, calculations, methods, and/or algorithms. Although a single vehicle controller 34 is shown in FIG. 1, the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the system 11.

The vehicle 10 includes a user interface 23 in communication with the vehicle controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification. The user interface 23 is in electronic communication with the vehicle controller 34 and is configured to receive inputs from the hearing-impaired vehicle occupant 25 (e.g., a vehicle user or a vehicle passenger). For example, the user interface 23 may include a touch screen and/or buttons configured to receive inputs from the hearing-impaired vehicle occupant 25. Accordingly, the vehicle controller 34 is configured to receive inputs from the hearing-impaired vehicle occupant 25 via the user interface 23 and to provide an output (i.e., an alert) to the hearing-impaired vehicle occupant 25. The user interface 23 may include a head-up display or another display and may allow the selection of a hearing-impaired mode, which enables the user interface 23 to check a box for a sign language selection dialog. For instance, the hearing-impaired vehicle occupant 25 may select an Americal Sign Language through the user interface 23 to allow the communication exchanges between the vehicle 10 and the remote system 100 using Americal Sign Language. As a consequence, the user interface 23 may display articulated sign language from the user 123 of the remote system 100 and other types of communication interactions by translating audio prompts from the remote system 100 into sign language (e.g., navigation directions). The user interface 23 may also translate chime information received from the remote system 100 into sign language. Alternatively, the vehicle 10 may translate chimes information from the remote system 100 into other feedback modalities, such as tactile feedback in a vehicle seat, steering wheel, and or pedal. By selecting the hearing-impaired mode through the user interface 23, the vehicle controller 34 adapts the feedback from the remote system 100 in response to a specific situation. For navigation purposes, the navigation directions provided by the remote system 100 may be in sign language. Also, for emergency services, the remote system 100 may notify first responders that the vehicle occupant has a hearing impairment condition. Further, in emergency situations, the vehicle controller 34 may command sensors 40 to automatically collect heath information about the hearing-impaired vehicle occupant 25. Also, the vehicle sensors 40 (e.g., microphones) may detect internal or external sounds and translate those sounds into in-cabin messages through the user interface 23 (e.g., text or sign language relating to sirens, tire damage, trim/tarp flapping, etc.). Further, the user interface 23 may include a notification if a specific sound is detected such as a horn or siren, or if a general sound is detected such as "external sound detected" or semantic information such as "emergency vehicle detected". The user interface 23 may also receive commands (e.g., find a nearby gas station) using one-handed signing or gesture.

With reference to FIGS. 1 and 2, the vehicle 10 includes one or more vehicle sensors 40 in communication with the vehicle controller 34. The vehicle sensors 40 collect information and generate sensor data indicative of the collected information and generate sensor data indicative of the collected information. As non-limiting examples, the vehicle sensors 40 may include Global Navigation Satellite System (GNSS) transceivers or receivers, yaw rate sensors, speed sensors, lidars, radars, ultrasonic sensors, microphones, external cameras, and in-cabin cameras 41, among others. At least one of the vehicle sensors 40 is an in-cabin camera 41 having field of view large enough to capture images inside the cabin 38 of the vehicle 10. Thus, the in-cabin camera 41 is configured to capture images of the scene 52 inside the vehicle 10. The scene 52 inside the vehicle 10 may include other vehicle occupants 55 and other objects 54 (e.g., car seat) in the cabin 38 of the vehicle 10.

The sensor data may undergo downsampling/oversampling and interpolation to ensure all the different sensors 40 have the same sensing frequency in the post processing phase of the method 200. As a result, the sensor data may be synthesized to get the sensor insight without consuming unnecessary system resources. The vehicle controller 34 may perform the downsampling/oversampling and interpolation of sensor data. The sensor data is also synchronized locally in the vehicle 10 and globally between the vehicle 10 and the remote system 100. Synchronizing sensors on local vehicles and synchronizing vehicle/cloud are critical components for this system.

The system 11 may perform an automatic identification of driver and passengers of the vehicle 10 via one or more cameras or smartphone location identifiers. The system 11 may automatically be configured based on overall context including identity, occupant locations and level of hearing impairment. For example, if a single hard of hearing driver is detected, then the radio level may be set to a high setting. However, if there are other non-hearing-impaired occupants present, then the radio level is set to a nominal level. As another example, if there is a mix of non-hearing impaired and hearing-impaired occupants in the vehicle 10, their locations can be known, and in-cabin transcription services may be activated and streamed to a relevant vehicle display or their connected device. As yet another example, if there are two back seat passengers, one hearing impaired and one not, then the content for the hearing-impaired passenger will include close captions by default.

As mentioned above, live captions may be implemented using vehicle microphones that record cabin conversations and display transcriptions on vehicle displays for occupants with hearing impairment. These captions may also be sent to passenger devices, such as a smartphone. Also, live transcriptions of the articulated sign language for other passengers to read may be presented on vehicle displays, or articulated sign-to-text audio playback may be generated using vehicle speakers to enable interactive conversations between hearing impaired and non-hearing-impaired individuals.

The hearing impairment status of the vehicle occupants may be used to assess driver information needs based on associating hearing impairment status and measured driver behaviors and responses. For example, the rate of forward collision alerts (FCA) that occur for hearing impaired individuals versus other groups could be used to configure default following distance indications, alert modality type and intensity settings, or other vehicle safety settings.

With reference again to FIG. 1, the remote-system 100 includes at least one remote-system controller 134 having a remote-system processor 144 and a remote-system non-transitory computer readable storage device or media 146. The remote-system processor 144 may be a custom-made processor, a central processing unit (CPU), a graphics processing unit (GPU), an auxiliary processor among several processors, a semiconductor-based microprocessor (in the form of a microchip or chip set), a macroprocessor, a combination thereof, or generally a device for executing instructions. The remote-system computer readable storage device or media 146 may include volatile and nonvolatile storage in read-only memory (ROM), random-access memory (RAM), and keep-alive memory (KAM), for example. KAM is a persistent or non-volatile memory that may be used to store various operating variables while the remote-system processor 144 is powered down. The remote-system computer-readable storage device or media 146 of the remote-system controller 134 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the remote-system controller 134 in providing vehicle connected services. The remote-system non-transitory computer readable storage device or media 146 includes machine-readable instructions that when executed by the one or more remote-system processors 144, cause the remote-system processors 144 to execute at least part of the method 200 (FIG. 3).

The remote system 100 may include one or more remote-system communication transceivers 37 in communication with the controller 34. Each of the remote-system communication transceivers 37 is configured to wirelessly communicate information to and from other remote actors, such as the vehicle 10, infrastructure and/or personal electronic devices, such as a smart phone. The vehicle communication transceivers 37 may be configured to communicate via the wireless network 50 (e.g., cellular network, including 4G, 5G and 6G). However, additional or alternate communication methods, such as a dedicated short-range communications (DSRC) or Cellular V2X (C_V2X) channel, are also considered within the scope of the present disclosure. DSRC or C-V2X channels refer to one-way or two-way short-range to medium-range wireless communication channels specifically designed for automotive use and a corresponding set of protocols and standards. Accordingly, the remote-system communication transceivers 37 may include one or more antennas for receiving and/or transmitting signals, such as cooperative sensing messages (CSMs). The vehicle communication transceivers 37 may be considered sources of data.

The remote system 100 includes a plurality of remote-system sensors 140 in communication with the remote-system controller 134. The remote-system sensors 140 collect information and generate sensor data indicative of the collected information. As non-limiting examples, the remote-system sensors 40 may microphones and remote-system cameras 141. At least one of the remote-system sensors 40 is a vehicle remote-system camera 141 having field of view large enough to capture images of the user 123 (e.g., advisor) of the remote system 100. Thus, the remote-system camera 141 is configured to capture images of the user 123 of the remote system 100. For example, the remote-system camera 141 may capture video from the user 123 of the remote system while the user 123 is articulating sign language (i.e., remote-system message). Then, the remote-system controller 134 may translate the sign language articulated by the user 123 into audio and/or text. The remote-system sensors 140 (e.g., microphone) may also capture speech uttered by the user 123 of the remote system 100. Then, the remote-system controller 134 may translate the speech uttered by the user 123 of the remote system into text and/or sign language. The remote system 100 may also include input/output virtual sensors that locally synchronize with the vehicle sensors 40 through the virtual I/O methods, enabling the remote system to have seamless inputs and outputs from vehicle sensors. Specifically, the virtual sensors of the remote systems 100 may be locally synchronized with each other. Additionally, the virtual sensors of the remote system 100 may be synchronized with each corresponding vehicle sensor 40.

FIG. 3 is a flowchart of a method 200 for enabling vehicle connected services for hearing-impaired vehicle occupants 25. The method 200 begins at block 202. At block 202, the vehicle sensors 40 collect data about the scene 52 inside the vehicle 10 and generate sensor data. The sensor data therefore includes scene data. The scene data is indicative of the scene 52 inside the vehicle 10 and may include audio data, video data, semantic data, context data, and text data. As used herein, the term "semantic data" means data that has been prepared to assign meaning to the scene 52 in the vehicle 10. The semantic data may include camera-based occupant sensing data (e.g., location) and data originating from DMS (identity, attention, expressions) or biometric systems (e.g., health status, anxiety levels).

In the present disclosure, the term "context data" means data that gives context to the scene 52 inside the vehicle 10.

The term "text data" means information including solely text. For example, the sign language articulated by the hearing-impaired vehicle occupant 25 may be translated into text, and this text may be represented as text data. The scene data includes one or more images (e.g., video) of the hearing-impaired vehicle occupant 25 inside the vehicle 10. As a consequence, the sensor data may include video of the hearing-impaired vehicle occupant 25 inside the vehicle 10 articulating sign language. As used herein, the term "sign language" means a formal language employing a system of hand gestures and their placement relative to the upper body, facial expressions, body postures, and finger spelling especially for communication by and hearing-impaired people. As non-limiting examples, the sign language may be American Sign Language (ASL), Chinese Sign Language (CSL), or German Sign Language. At block 202, the vehicle controller 34 receives the sensor data from the vehicle sensors 40. Further, at block 202, the vehicle controller 45 locally synchronizes all the sensor data via a controller area network (CAN) of the vehicle 10. The CAN may use ethernet connections for synchronizing all the sensor data. The sensor data may undergo downsampling. Then, the sensor data is aggregated, buffered, and processed. Next, the method 200 continues to block 204.

At block 204, the vehicle controller 34 determines, using the sensor data, that the hearing-impaired vehicle occupant 25 is articulating sign language. For example, the vehicle controller 34 may use the input from the in-cabin camera 41 to determine that the hearing-impaired vehicle occupant 25 is articulating sign language data. It is envisioned, however, that the vehicle controller 34 may send the sensor data (e.g., video of the hearing-impaired vehicle occupant 25 to the remote system 100, and the remote-system controller 134 may determine that the hearing-impaired vehicle occupant 25 is articulating sign language using the sensor data. The processing tasks may be dynamically or fixedly partitioned between the vehicle 10 and the remote system 100. As non-limiting examples, the processing tasks, such as sign language interpretation, pose estimation, facial expressions, among others, may be performed either in the vehicle controller 34 and/or the remote system 100. For example, if a processing task is computationally intensive, that processing task is performed in the remote system 100. If a performing tasks are not computationally intensive, then this performing tasks may be performed in the vehicle controller 34. Then, the method 200 continues to block 206.

At block 206, the vehicle controller 34 and/or the remote system 100 determines the message corresponding to the sign language articulated by the hearing-impaired vehicle occupant 25 (i.e., the vehicle-occupant message). The vehicle-occupant message is represented as vehicle occupant-message data and may include text data, audio data, and/or video data. For example, the sign language articulated by the hearing-impaired vehicle occupant 25 may be translated into text (e.g., text data) and displayed in the user interface 23. Using natural language processing, the vehicle controller 34 and/or the remote system 100 may automatically convert a video of the sign language articulated by the hearing-impaired vehicle occupant to a text message and then convert the text message to an audio message. Next, the method 200 continues to block 208.

At block 208, the vehicle controller 34 and/or the remote-system controller 134 monitor the quality of service (QOS) metrics of the wireless network 50 to optimize data transmission between the vehicle 10 and the remote system 100. As non-limiting examples, the QoS of the wireless network 50 may include bandwidth, packet drop rate, delay, and jitter to determine what kind of data will be exchanged between the vehicle 10 and the remote system 100. For example, if the bandwidth available in the wireless network 50 connecting the vehicle 10 and the remote system 100 is greater than a first predetermined bandwidth threshold, then the vehicle controller 34 transmits the audio data and the video data to the remote system 100. If the bandwidth available in the wireless network 50 connecting the vehicle 10 and the remote system 100 is equal to or less than the first predetermined bandwidth threshold and greater than a second predetermined bandwidth threshold, then the vehicle controller 34 transmit the audio data and the semantic data to the remote system 100 and refrains from transmitting the video data from the vehicle 10 to the remote system 100. The second predetermined bandwidth threshold is less than the first predetermined bandwidth threshold. If the bandwidth available in the wireless network 50 connecting the vehicle 10 and the remote system 100 is less than or equal to the third predetermined bandwidth threshold, then the vehicle 10 transmits the text data and the vehicular context data to the remote system 100 and refrains from transmitting the audio data, the video data, and the semantic data from the vehicle 10 to the remote system 100. The third predetermined bandwidth threshold is less than the second predetermined bandwidth threshold.

Further, at block 208, the vehicle controller 34 and/or the remote-system controller 134 may monitor, in real time, the QoS metrics at a link level and a path level. The network path from the vehicle 10 to the remote system 100 may include a plurality of links (e.g., one link from the vehicle 10 to a radio access network (RAN) base station and another link from the RAN base station to the remote system 100). The entire path in the wireless network 50 is defined from the vehicle 10 to the remote system 100. Thus, at block 208, the vehicle controller 34 and/or the remote-system controller 134 may monitor the QoS metrics along each link of the path from the vehicle 10 to the remote system 100 and along an entirety of the path defined from the vehicle 10 to the remote system 100. As discussed above, the QoS metrics may include packet drop rate, delay, jitter, and/or bandwidth. The vehicle controller 34 and/or the remote-system controller 134 may measure the QoS metrics of each outgoing link in real-time. The path-level QoS may be aggregated from link-level QoS measurements along the whole path between the vehicle 10 and the remote system 100. The path-level QoS may be described using the following equations:

$$\tau_{Path}(t) = \sum_i \tau_{link}^i(t) \qquad \text{Eq. 1}$$

$$\sigma_{Path}(t) = \max_i \left(\sigma_{link}^i(t)\right) \qquad \text{Eq. 2}$$

$$T_{Path}(t) = \min_i \left(T_{link}^i(t)\right) \qquad \text{Eq. 3}$$

where:
t is time;
$\tau_{Path}(t)$ is the path-level delay of the network path between the vehicle 10 and the remote system 100;
i is a link of the network path from the vehicle 10 to the remote system 100;
$\tau_{link}^i(t)$ is the link level delay at a link i of the network path between the vehicle 10 and remote system 100 at time t;
$\sigma_{Path}(t)$ is a path-level jitter of the network path between the vehicle 10 and the remote system 100 at time t;

$\sigma_{link}^{i}(t)$ is a link level jitter at the link i of the network path between the vehicle 10 and the remote system 100 at time t;

$T_{link}^{i}(t)$ is a path-level bandwidth of the network path between the vehicle 10 and the remote system 100 at time t;

$T_{path}(t)$ is a link level bandwidth of the link i of the network path between the vehicle 10 and the remote system 100 at time t;

The method 200 then proceeds to block 210.

At block 210, the vehicle controller 34 commands the vehicle communication transceivers 37 to transmit the scene data and the vehicle occupant-message data to the remote system 100 through the wireless network 50. The vehicle controller 34 may decide which kind of data to transmit to the remote system 100 (e.g., text data, audio data, video data) based on the QoS metrics of the wireless network 50 as discussed above. The network update rate of the transmission of the scene data from the vehicle 10 to the remote system 100 may be updated based on the importance of the different objects in the scene 52 inside the vehicle 10 in order to reduce the network resources consumption. This reduction in network resources consumption may be achieved through image semantic segmentation. For instance, the vehicle controller 34 and/or the remote-system controller 134 may employ semantic segmentation of the images captured by the in-cabin camera 41 to classify the objects 54 in the scene 52 inside the vehicle 10. The in-cabin scene processing may be done onboard, offboard or hybrid (local camera processing into semantic data).

The object may include focused objects and less-focused objects. Then, the vehicle controller 34 and/or the remote-system controller 134 assigns a priority to each object 54 in the scene 52 inside the vehicle 10. For instance, the vehicle controller 34 and/or the remote-system controller 134 may assign a higher priority to animated objects, such as the hearing-impaired vehicle occupant 25, than to inanimate objects, such as a child seat. Then, vehicle controller 34 and/or the remote-system controller 134 creates a scene and object priority list, which lists all the objects 54 in the scene 52 inside the vehicle 10 and their respective assigned priority. Next, the vehicle controller 34 and/or the remote-system controller 134 adjust the network update rate based on the priority of each of the plurality of objects 54 in the scene inside the vehicle 10. Next, the method 200 continues to block 212.

At block 212, the remote system 100 receives the vehicle occupant-message data and the scene data from the vehicle 10. As discussed above, the vehicle occupant-message data and the scene data may be synchronized in real time between the vehicle 10 and the remote system 100. The remote-system controller 134 and/or the vehicle controller 34 may then interpret the scene 52, detects the object in the scene, estimates the pose of the hearing-impaired vehicle occupant 25, detect and interprets the gestures (e.g., sign language) by the hearing-impaired vehicle occupant 25, detects and interprets the facial expressions by the hearing-impaired vehicle occupant 25. To do so, the system 11 may generate and store meta data for facial expressions to communicate not only the content of what the hearing-impaired occupant is articulating, but also the semantics information of facial expression or the tone of voice. For example, the meta data may include tags such as [stressful], [disturbed], etc. to ensure what is being articulated to text accurately conveys user stress or tone (i.e., prosody). Facial expressions may have higher weight for hearing impaired users when comparing to. non-hearing-impaired users. Moreover, the hearing impairment status may be used to support certain types of in-cabin sensing features that utilize expression, such as detecting occupant mood, activity, or distress.

Further, the remote-system controller 134 may include a signing-to-speech engine to translate the sign language articulated by the hearing-impaired vehicle occupant 25 to audio and/or text. The remote-system controller 134 also identifies the context in the scene 52 inside the vehicle 10 and identifies the intention of the hearing-impaired vehicle occupant 25. For example, the remote-system controller 134 may determine, using the sensors 40 (e.g., external cameras and speed sensors), that the vehicle 10 is inoperative and that the hearing-impaired vehicle occupant 25 is asking for roadside assistance based on the articulated sing language. The remote-system controller 134 also synthesizes the semantics of the scene 52 to understand the entire situation. Then, the remote-system controller 134 communicates (through, for example, a display) the situation (in audio, video, and/or text form) to the user 123 of the remote system 100. Then, the method 200 continues to block 214.

At block 214, the remote system 100 provides a vehicle connected service to the hearing-impaired vehicle occupant 25 in response to the vehicle-occupant message. As non-limiting examples, vehicle connected services include emergency services, remote vehicle access, navigation directions, remote vehicle start, and roadside assistance. Providing the vehicle connected service may entail transmitting a notification (e.g., remote-system message and/or chime) relating to the vehicle connected services provided by the remote system 100. For example, the notification may include text and/or video of a person articulating sign language corresponding to the notification relating to the vehicle connected service. The video and/or text may be displayed on the user interface 23 of the vehicle 10. The remote-system message may be represented as remote-system message data. The remote-system message data may include remote articulated sign language data from the user 123 of the remote system 100. The remote articulated sign language data may include a video of the user 123 of the remote system 100 articulating sign language. It is also contemplated that the remote articulated sign language data may be converted from audio received from the user 123 of the remote system 100.

Further, at block 214, the remote system 100 may provide an automated response (e.g., vehicle connected service) based on the vehicle-occupant message received from the vehicle 10. In this case, the user 123 of the remote system 100 is not involved in the provision of the vehicle connected services to the hearing-impaired vehicle occupant 25. Rather, the remote system 100 automatically (and without human interaction) provides vehicle connected services to the hearing-impaired vehicle occupant 25 in response to the message received from the hearing-impaired occupant 25.

Figure 4:
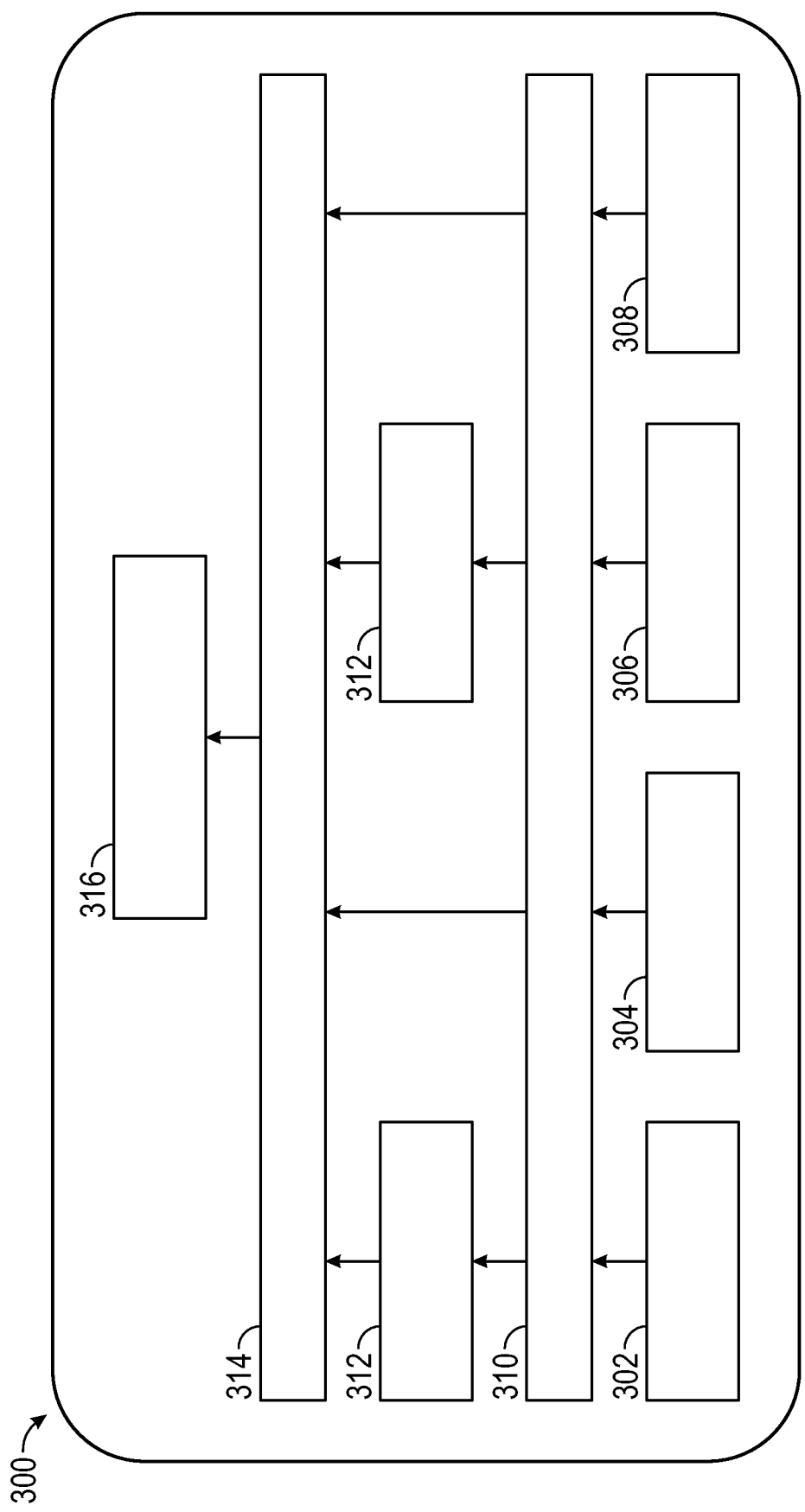
FIG. 4 is a flowchart of a contextual inference method performed in the vehicle.

FIG. 4 is a flowchart of a contextual inference method. The method 300 is performed in the vehicle 10 and begins at block 302, block 304, block 306, and block 306. Block 302 entails receiving sensor data from an in-cabin camera of the vehicle 10. Block 304 entails receiving sensor data from the in-cabin microphone of the vehicle 10. Block 306 entails receiving sensor data from an external camera of the vehicle 10. Then, the method 300 proceeds to block 310. At block 310, the sensor data in the vehicle system 11 and the remote system 100 are synchronized via a computer area network (CAN) and/or ethernet. Then, the method 300 continues to blocks 312. Blocks 312 entails downsampling the sensor data. Then, the method 300 proceeds to block 314. Block 314 entails aggregating, buffering, and processing the sensor data. Next, the method 300 continues to block 316. Block 316 entails transmitting the sensor data to the remote system 100 (e.g., cloud-based system).

Figure 5:
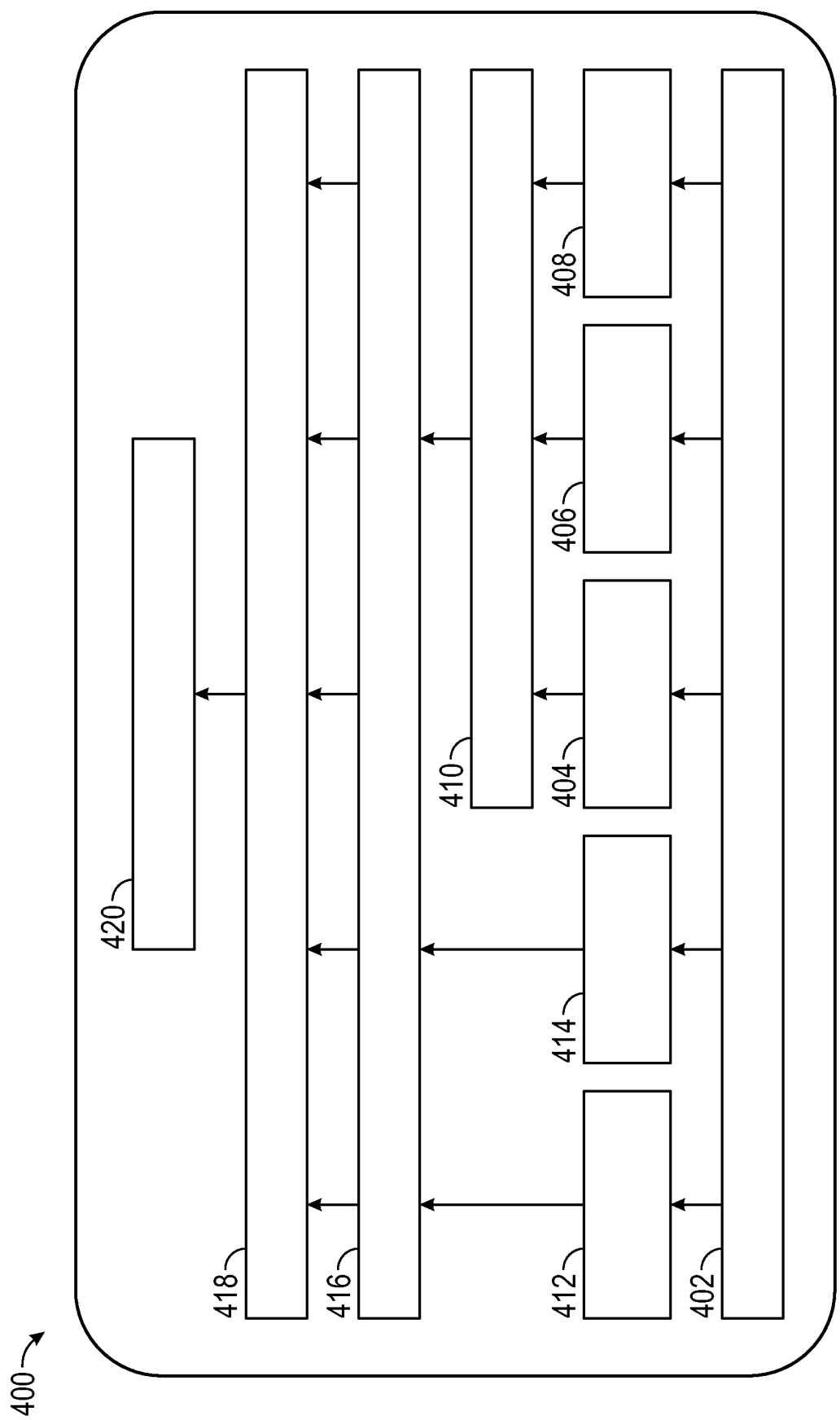
FIG. 5 is a flowchart of a contextual inference method performed in the remote system.

FIG. 5 is a flowchart of a contextual inference method 400 performed in the remote system. The method 400 begins at block 402. Block 402 entails receiving synchronized multivariate vehicle sensor data streams. Then, the method 400 continues to blocks 404, 406, 408, 412, and 414. Block 404 entails determining the pose estimation of the vehicle occupants (e.g., hearing-impaired vehicle occupant 25). Block 406 entails detecting the gestures of the vehicle occupants (e.g., hearing-impaired vehicle occupant 25). Block 408 entails identifying the facial expressions of the vehicle occupants (e.g., hearing-impaired vehicle occupant 25. Block 412 entails interpreting the scene inside and outside the vehicle 10. Block 414 entails detecting objects inside the vehicle 10. Then, the method 300 proceeds to block 410. At block 410, the remote system 100 runs a signing-to-speech engine to convert the articulated sign language into speed (i.e., audio). Then, the method 400 continues to block 416. At block 416, the remote system 100 infers the vehicle context inference and identifies the intention of the vehicle occupant (e.g., hearing-impaired vehicle occupant 25) using the sensor data. Then, the method 400 proceeds to block 418. At block 418, the remote system 100 executes semantics synthesis to synthesis the semantics inside and/or outside the vehicle 10. Then, the method 400 continues to block 420. At block 420, the remote system 100 interprets the data for the user 123 of the remote system 100.

Figure 6:
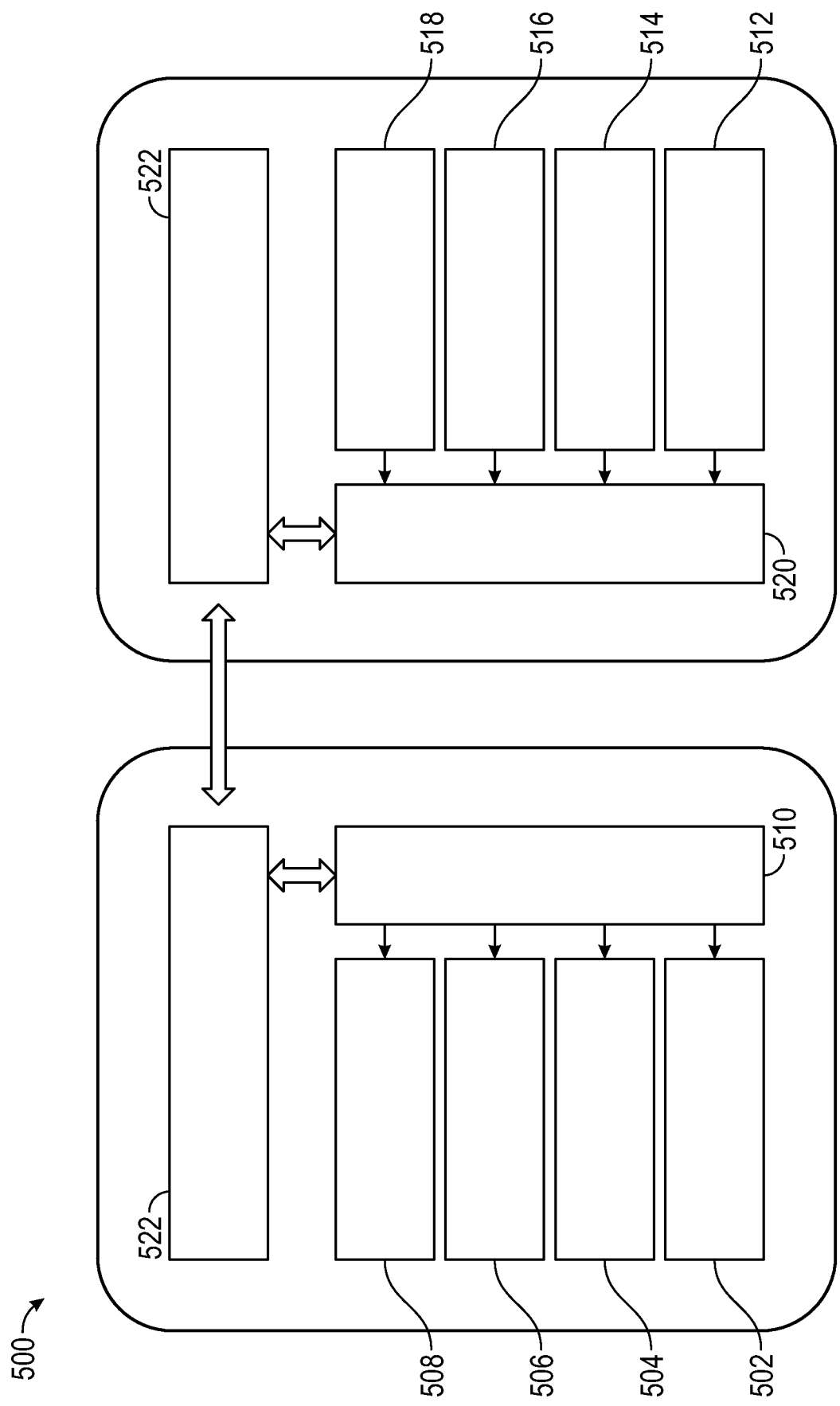
FIG. 6 is a flowchart of a synchronization method for sensor data streaming.

FIG. 6 is a flowchart of a synchronization method 500 for sensor data streaming. On the vehicle side, the method 500 begins at blocks 502, 504, 506, and 508. Block 502 entails receiving the sensor data from the in-cabin camera of the vehicle 10. Block 504 entails receiving the sensor data from the in-cabin microphone of the vehicle 10. Block 506 entails receiving the sensor data from the external camera of the vehicle 10. Block 508 entails receiving the sensor data from other vehicle sensors 40. The method 500 additionally includes block 510. Block 510 entails on-board in-band synchronization of all the sensor data collected by the vehicle 10. On the remote system side, the method 500 includes blocks 512, 514, 516, and 518. Block 512 entails receiving the sensor data corresponding to the in-cabin camera in the virtual sensor of the remote system 100 through virtual I/O methods. Block 514 entails receiving the sensor data corresponding to the in-cabin microphone in the virtual sensor of the remote system 100 through virtual I/O methods. Block 516 entails receiving the sensor data corresponding to the external camera in the virtual sensor of the remote system 100 through virtual I/O methods. Block 518 entails receiving the sensor data corresponding to the other vehicle sensors 40 in the virtual sensor of the remote system 100 through virtual I/O methods. Then, the method 500 continues to block 520. Block 420 entails cloud in-band synchronization to synchronize all the sensor data in the remote system 100. The method 500 then proceeds to block 522. Block 522 entails synchronizing the sensor data between the vehicle 10 and the remote system 100.

Figure 7:
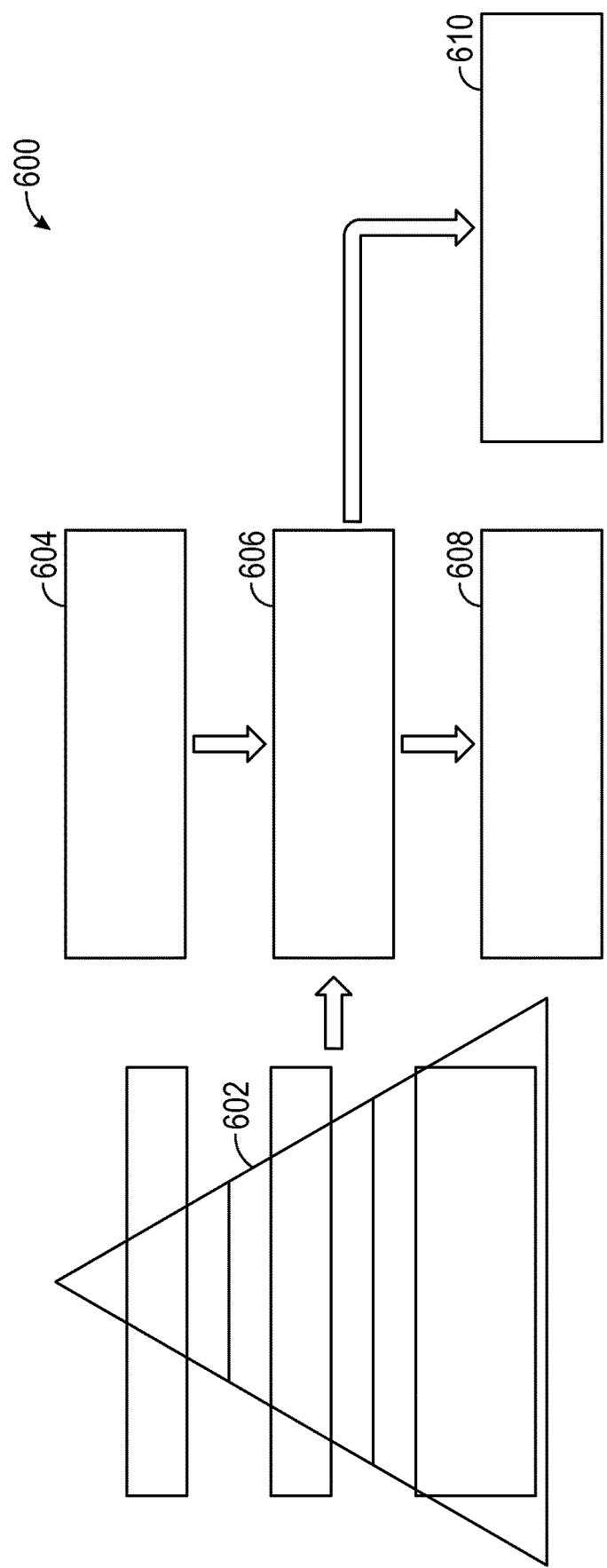
FIG. 7 is a flowchart of an adaptive scene-sematic rendering method.

FIG. 7 is a flowchart of an adaptive scene-sematic rendering method 600. The method 600 begins at block 602. Block 602 entails receiving scene data and information abstraction priority list or pyramid. The priority list may include, in order of priority from high priority to lower priority, the following data: 1) text and context information; 2) semantics and audio data; and 3) down-sampled video and vehicle sensor data. The method 600 also includes block 604. Block 604 entails determining, in real-time, the network condition (e.g., bandwidth, jitter, delay) of the network 50 interconnecting the vehicle 10 and the remote system 100. Then, the method 600 continues to block 606. Block 606 entails executing an adaptive semantic information rendering protocol. The adaptive semantic information rendering protocol intelligently selects the proper approach of providing scene information (e.g., vehicle context and vehicle occupant status and intention) to the user 123 of the remote system 100. Then, the method 600 continues to blocks 608 and 610. Block 608 entails executing a speech-to signing engine to convert the speech by the user 123 of the remote system 100 to sign language. Block 610 entails transmitting data between the remote system 100 and the vehicle 10 depending on the network condition of the network 50 as discussed above.

Figure 8:
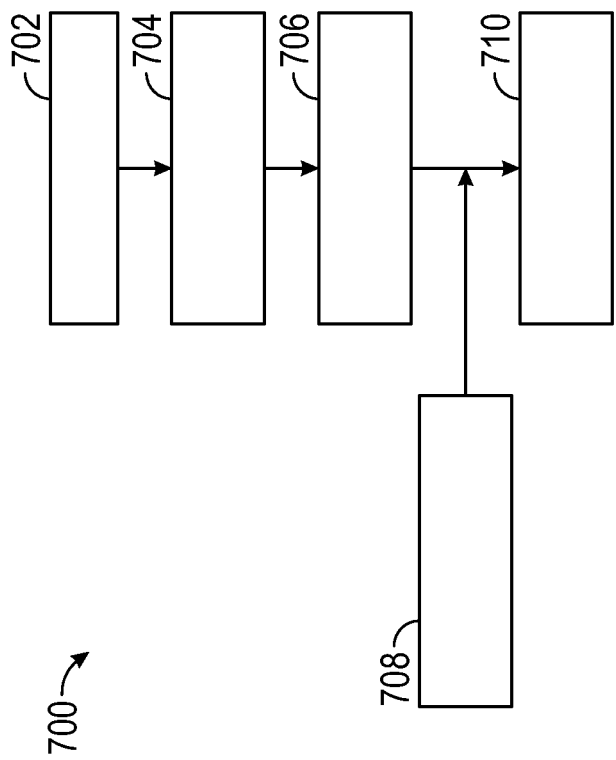
FIG. 8 is a flowchart of an adaptive semantic rendering method.

FIG. 8 is a flowchart of an adaptive semantic rendering method 700. The method 700 provides different network data update rates based on the importance of different objects in the in-vehicle scene in order to reduce the network resource consumption. begins at block 702. Block 702 entails receiving the raw image from the in-cabin camera of the vehicle 10. Then, the method 700 proceeds to block 704. Block 704 entails executing an image semantic segmentation to identify objects in the scene inside the vehicle 10. Then, the method 700 proceeds to block 706. Block 706 entails receiving and processing a scene and object priority list based on the importance of the objects in the scene inside the vehicle 10. Then, the method 700 continues to block 708. Block 708 entails determining, in real time, the network condition of the network 50. This may entail determining the bandwidth, jitter, and delay of the network 50. Next, the method 700 proceeds to block 710. Block 710 entails updating the adjusting the object segment update rate based on the scene and object priority list.

Figure 9:
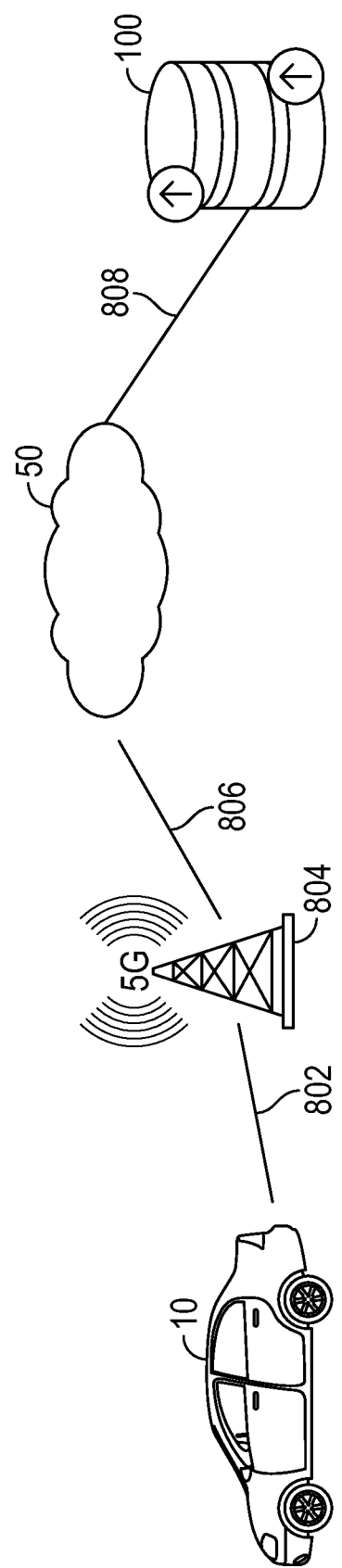
FIG. 9 is a schematic diagram of a vehicle and a remote system connected through a network.

With respect to FIG. 9, the vehicle 10 is wirelessly connected to the remote system 100 (e.g., cloud0-based system) through the network 50. The network path from the vehicle 10 to the remote system 100 may include a plurality of links. For example, the network path includes a first link 802 interconnecting the vehicle 10 and a radio access network (RAN) base station 804. The network path may include a second link 806 interconnecting the RAN base station 804 to the wireless network 50 (e.g., Internet). The network path may include a third link 808 interconnecting the wireless network 50 (e.g., Internet) and the remote system 100. To determine the network condition, the vehicle controller 34 and/or the remote-system controller 134 may measure the QoS metrics of each outgoing link in real-time. The path-level QoS may be aggregated from link-level QoS measurements along the whole path between the vehicle 10 and the remote system 100.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for enabling vehicle connected services for a hearing-impaired vehicle occupant, comprising:
    receiving sensor data from a plurality of sensors of a vehicle, wherein the sensor data includes scene data indicative of a scene inside the vehicle, and the scene data includes an image of the hearing-impaired vehicle occupant;
    determining that the hearing-impaired vehicle occupant is articulating sign language using the sensor data;
    in response to determining that the hearing-impaired vehicle occupant is articulating sign language, determining a vehicle-occupant message corresponding to the sign language articulated by the hearing-impaired vehicle occupant to generate vehicle occupant-message data, wherein determining the vehicle-occupant message includes automatically converting a video of the sign language articulated by the hearing-impaired vehicle occupant to a text message and converting the text message to an audio message, and the vehicle occupant-message data is indicative of the vehicle-occupant message corresponding to the sign language articulated by the hearing-impaired vehicle occupant;
    in response to generating the vehicle occupant-message data, transmitting the vehicle occupant-message data and the scene data to a remote system; and
    in response to transmitting the vehicle occupant-message data and the scene data to the remote system, receiving a vehicle connected service from the remote system, wherein the vehicle connected service is responsive to the vehicle-occupant message from the hearing-impaired vehicle occupant.

2. The method of claim 1, wherein the sensor data includes kinematic sensor data, vehicle occupancy data, the scene data includes audio data and video data, and the method further comprises:
    determining a bandwidth available in a wireless network connecting the vehicle and the remote system in real-time fashion;
    determining whether the bandwidth available in the wireless network connecting the vehicle and the remote system is greater than a first predetermined bandwidth threshold; and
    in response to determining that the bandwidth available in the wireless network connecting the vehicle and the remote system is greater than the first predetermined bandwidth threshold, transmitting the audio data and the video data from the vehicle to the remote system.

3. The method of claim 2, wherein the scene data further includes semantic data, and the method further comprises:
    determining whether the bandwidth available in the wireless network connecting the vehicle and the remote system is greater than a second predetermined bandwidth threshold;
    determining whether the bandwidth available in the wireless network connecting the vehicle and the remote system is greater than a second predetermined bandwidth threshold, wherein the second predetermined bandwidth threshold is less than the first predetermined bandwidth threshold; and
    in response to determining that the bandwidth available in the wireless network connecting the vehicle and the remote system is less than or equal to the first predetermined bandwidth threshold and greater than the second predetermined bandwidth threshold, transmitting the audio data and the semantic data from the vehicle to the remote system and refraining from transmitting the video data from the vehicle to the remote system.

4. The method of claim 3, wherein receiving the vehicle connected service from the remote system includes receiving a remote-system message, wherein the remote-system message includes remote articulated sign language data from a user of the remote system, and the remote articulated sign language data includes a video of the user of the remote system articulating sign language in response to the vehicle-occupant message.

5. The method of claim 4, wherein the remote articulated sign language data is converted from audio received from the user of the remote system.

6. The method of claim 5, further comprising:
employing sematic segmentation to classify a plurality of objects in the scene inside the vehicle;
assigning a priority to each of the plurality of objects in the scene inside the vehicle; and
adjusting a network update rate of each of the plurality of objects based on the priority of each of the plurality of objects in the scene inside and outside the vehicle.

7. The method of claim 6, wherein a path is defined in the wireless network from the vehicle to the remote system, and the path includes a plurality of links, and the method further comprises:
monitoring quality-of-service (QOS) metrics along each of the plurality of links of the path; and
monitoring the QoS metrics along an entirety of the path defined from the vehicle to the remote system; and
wherein the QoS metrics includes delay, jitter, packet drop rates, and bandwidth.

8. The method of claim 7, wherein transmitting the vehicle occupant-message data and the scene data to the remote system includes synchronizing, in real time, the vehicle occupant-message data and the scene data between the vehicle and the remote system.

9. The method of claim 8, further comprising locally synchronizing the scene data among all of the plurality of sensors of the vehicle through the same system timestamp across the plurality of sensors.

10. The method of claim 9, wherein the remote system includes a plurality of virtual sensors that correspond to the plurality of sensors of the vehicle, and the method further comprises locally synchronizing the scene data among all of the plurality of virtual sensors at the side of the remote system.

11. The method of claim 1, further comprising performing processing tasks, wherein the processing tasks include determining the vehicle-occupant message corresponding to the sign language articulated by the hearing-impaired vehicle occupant, and the method further includes partitioning the performing tasks between a vehicle controller and the remote system.

12. A system for enabling vehicle connected services for a hearing-impaired vehicle occupant, comprising:
a plurality of sensors;
a controller in communication with the plurality of sensors, wherein the controller is programmed to:
receive sensor data from a plurality of sensors of a vehicle, wherein the sensor data includes scene data indicative of a scene inside the vehicle, and the scene data includes an image of a hearing-impaired vehicle occupant;
determine that the hearing-impaired vehicle occupant is articulating sign language using the sensor data;
in response to determining that the hearing-impaired vehicle occupant is articulating sign language, determine a vehicle-occupant message corresponding to the sign language articulated by the vehicle occupant to generate vehicle occupant-message data, wherein determining the vehicle-occupant message includes automatically converting a video of the sign language articulated by the hearing-impaired vehicle occupant to a text message and converting the text message to an audio message, and the vehicle occupant-message data is indicative of the vehicle-occupant message corresponding to the sign language articulated by the vehicle occupant;
in response to generating the vehicle occupant-message data, transmit the vehicle occupant-message data and the scene data to a remote system; and
in response to transmitting the vehicle occupant-message data and the scene data to the remote system, receive a vehicle connected service from the remote system, wherein the vehicle connected service is responsive to the vehicle-occupant message from the hearing-impaired vehicle occupant.

13. The system of claim 12, wherein the scene data includes audio data and video data, and the controller is programmed to:
determine a bandwidth available in a wireless network connecting the vehicle and the remote system in a real-time fashion;
determine whether the bandwidth available in the wireless network connecting the vehicle and the remote system is greater than a first predetermined bandwidth threshold; and
in response to determining that the bandwidth available in the wireless network connecting the vehicle and the remote system is greater than the first predetermined bandwidth threshold, transmit the audio data and the video data to the remote system.

14. The system of claim 13, wherein the scene data further includes semantic data, and the controller is programmed to:
determine whether the bandwidth available in the wireless network connecting the vehicle and the remote system is less than or equal to the first predetermined bandwidth threshold;
determine whether the bandwidth available in the wireless network connecting the vehicle and the remote system is greater than a second predetermined bandwidth threshold, wherein the second predetermined bandwidth threshold is less than the first predetermined bandwidth threshold; and
in response to determining that the bandwidth available in the wireless network connecting the vehicle and the remote system is less than or equal to the first predetermined bandwidth threshold and greater than the second predetermined bandwidth threshold, transmit the audio data and the semantic data from the vehicle to the remote system and refraining from transmitting the video data from the vehicle to the remote system.

15. The system of claim 14, wherein the vehicle connected service includes a remote-system message from the remote system, and the remote-system message includes remote articulated sign language data from a user of the remote system, and the remote articulated sign language data includes video of the user of the remote system articulating sign language.

16. The system of claim 15, wherein the remote articulated sign language data is converted from audio received from the user of the remote system.

17. The system of claim 15, wherein each of the controller and the remote system is programmed to perform processing tasks and to partition the performing tasks between the controller and the remote system, and the processing tasks include determining the vehicle-occupant message corresponding to the sign language articulated by the hearing-impaired vehicle occupant.

18. A tangible, non-transitory, machine-readable medium comprising machine-readable instructions, that when executed by a processor, cause the processor to:
receive sensor data from a plurality of sensors of a vehicle, wherein the sensor data includes scene data indicative of a scene inside and outside the vehicle, and the scene data includes an image of a hearing-impaired vehicle occupant;
determine that the hearing-impaired vehicle occupant is articulating sign language using the sensor data;
in response to determining that the hearing-impaired vehicle occupant is articulating sign language, determine a vehicle-occupant message corresponding to the sign language articulated by the vehicle occupant to generate vehicle occupant-message data, wherein the vehicle occupant-message data is indicative of the vehicle-occupant message corresponding to the sign language articulated by the vehicle occupant;
in response to generating the vehicle occupant-message data, transmit the vehicle occupant-message data and the scene data to a remote system; and
in response to transmitting the vehicle occupant-message data and the scene data to the remote system, receive a vehicle connected service from the remote system, wherein the vehicle connected service is responsive to the vehicle-occupant message from the hearing-impaired vehicle occupant.

19. The tangible, non-transitory, machine-readable medium of claim 18, wherein the scene data includes audio data and video data, and the tangible, non-transitory, machine-readable medium further comprising machine-readable instructions, that when executed by the processor, causes the processor to:
determine a bandwidth available in a wireless network connecting the vehicle and the remote system in a real-time fashion;
determine whether the bandwidth available in the wireless network connecting the vehicle and the remote system is greater than a first predetermined bandwidth threshold; and
in response to determining that the bandwidth available in the wireless network connecting the vehicle and the remote system is greater than the first predetermined bandwidth threshold, transmit the audio data and the video data from the vehicle to the remote system.

20. The tangible, non-transitory, machine-readable medium of claim 19, wherein the tangible, non-transitory, machine-readable medium further comprising machine-readable instructions, that when executed by the processor, causes the processor to:
determine whether the bandwidth available in the wireless network connecting the vehicle and the remote system is less than or equal to the first predetermined bandwidth threshold;
determine whether the bandwidth available in the wireless network connecting the vehicle and the remote system is greater than a second predetermined bandwidth threshold, wherein the second predetermined bandwidth threshold is less than the first predetermined bandwidth threshold; and
in response to determining that the bandwidth available in the wireless network connecting the vehicle and the remote system is less than or equal to the first predetermined bandwidth threshold and greater than the second predetermined bandwidth threshold, transmit the audio data and semantic data from the vehicle to the remote system and refraining from transmitting the video data from the vehicle to the remote system.

* * * * *